Figure 1:
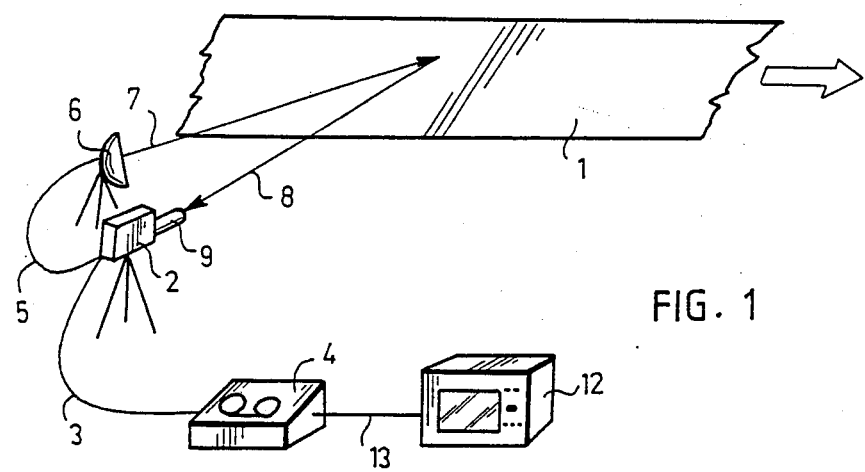

United States Patent [19]

Pajunen

[11] Patent Number: 4,918,522

[45] Date of Patent: Apr. 17, 1990

[54] METHOD OF TAKING PICTURES OF A QUICK-MOVING OBJECT BY MEANS OF VIDEO METHOD

[75] Inventor: Rauno Pajunen, Tampere, Finland

[73] Assignee: Tamfelt Oy Ab, Tampere, Finland

[21] Appl. No.: 230,340

[22] Filed: Aug. 9, 1988

[30] Foreign Application Priority Data

Aug. 14, 1987 [FI] Finland .................................. 873530

[51] Int. Cl.⁴ .............................................. H04N 7/18
[52] U.S. Cl. ...................................... 358/101; 358/93;
358/106; 360/5
[58] Field of Search .......................... 358/101, 106, 93;
360/5

[56] References Cited

U.S. PATENT DOCUMENTS 3,835,247  9/1974  Soames .................................... 358/93
4,567,506  1/1986  Shinoda ................................. 358/106
4,737,846  4/1988  Tokuno .................................. 358/101

OTHER PUBLICATIONS

*Image Technology*, Feb. 1989, "Worldwide National Television and Electricity Supply Standards", pp. 74-75.

*Stroboscopes*, General Radio, Mar. 1973, pp. 1-8.

*Primary Examiner*—Howard W. Britton
*Attorney, Agent, or Firm*—Lowe, Price, LeBlanc, Becker & Shur

[57] ABSTRACT

A method of taking pictures of a quick-moving object by means of a video apparatus, whereby the quick-moving object, e.g. a paper web, is exposed to a short light impulse and a light impulse reflected from the object is used to produce an image on an image sensor of semiconductor type in the camera. The light impulse brings dot detectors of the image sensor into a detection state corresponding to the light intensity of each dot, where they remain after the end of the light impulse, whereby the image remains in the storage of the image sensor and can in a normal way by read and recorded on a video tape in the video tape recorder.

6 Claims, 2 Drawing Sheets

METHOD OF TAKING PICTURES OF A QUICK-MOVING OBJECT BY MEANS OF VIDEO METHOD

The invention relates to a method of taking pictures of a quick-moving object by means of a shooting method of video type in order to get still-frames substantially stopping the object, in which method light coming from the object of shooting is conducted during a predetermined exposing time through a camera lens on a light sensitive image display in order to produce on its screen an image corresponding to the object of shooting, the image produced on the screen of the image display read to be converted into electric signals, and the electric signals are recorded in the form of a variable magnetic field on a video tape, whereby the exposing time is shorter than the time used for reading and recording the image.

It is impossible to follow with the naked eye a movement of quick-moving objects, as machine parts of different appearances, flying objects or for instance a paper web in a paper machine. When trying to find out the real movement of quick-moving objects and other phenomena attached thereto, it must be possible to slow down the phenomenon and the movement to make them observable for the human eye. Efforts have been made to carry out this by means of video-type shooting apparatuses so that pictures are taken of the object at high frame speeds and at viewing reproduced at lower speeds, by means of which the proportions between different details and their movements with respect to each other can clearly be observed.

In a known apparatus, the image is analyzed so that the image coming on the image display of the video camera is converted into a digital form and recorded on a specific multi-track instrument tape recorder, after which the image in the digital form is at reproduction converted by approximating by means of a specific image processor into an image approximately corresponding to the original image. First of all, a drawback of the apparatus is that the image is during the whole shooting time converted into data form, whereby e.g. a certain point on a paper web moving 1000 m/min is displaced 18 mm on the frame. In practice, this means that the method used in this apparatus cannot provide an accurate image of quick-moving objects, but it has to be produced by calculating and approximating by means of a micro processor, which does not correspond to the accuracy required by research. Further, the duration of recording tape in an apparatus functioning according to this method is only half a minute at the frame speed of 1000 pictures per second, whereby it is almost impossible to clear up and investigate some occasionally occurring disturbance by means of this apparatus. When trying to clear up e.g. a tear of a certain kind or the like occasionally occurring in a paper web, the interval between two similar disturbances can be even days. With tape durations of less than one minute, it is practically impossible to take pictures of such a disturbance. Further, the apparatus functioning according to this method has a big size, it is difficult to transport and additionally, it is extremely expensive.

In another known apparatus, conventional video technique based on picture tubes is used, the frame speed being 200 frames per second. In this apparatus a method is used, according to which an object of shooting at first is exposed to a stroboscope light for a while and after that the light is allowed to reflect from the object on picture tubes for a period of approximately 0.1 milliseconds, after which the light is by means of a separate mechanical shutter prevented from coming on the picture tubes. The image is recorded according to normal video system from the picture tubes on a video tape. When this apparatus is used, a paper web moving 1000 m/sec. has time to move along 1,8 mm, whereby a drop of water with a typical diameter of approximately 4 mm is visible on the frame, stretched to one and a half-fold size with respect to the direction of motion of the web, which does not correspond to the accuracy required. Because of the after-delay of the tubes, the apparatus needs besides the exposure also a separate mechanical shutter in order to get the produced image recorded on the video tape with at least satisfactory quality. Further, the apparatus has a big size and it is difficult to transport and also expensive.

The intention of this invention is to provide a method of taking pictures of quick movements by video method, by means of which accurate pictures can be taken even of quick movements and in which method the apparatus to be used is cheap and easy to transport even in difficult factory circumstances. According to the invention, this can be achieved by means of a method, characterized in that as image display is used an image sensor of semiconductor type known per se and consisting of dot detectors situated like a matrix, and that a short exposing time is used to conduct light from the object of shooting to form a light impulse, and that the intensity of a sufficiently strong light impulse is substantially constant during the exposing time, that said image sensor is activated by said light impulse, under the influence of which the dot detectors of the image sensor are brought into a detection state corresponding to the corresponding dots of the image produced on the screen of the image sensor, in which state they remain after the end of the light impulse, and that the detection state indicated by the dot detectors of the image sensor is read and recorded substantially after the activation of the image sensor.

The method of the invention is based on the idea of using an image sensor of semiconductor type, the properties of which are utilized in a new manner. Deviating from normal shooting practice, the dot detectors of the sensor are used as storage means, which are brought by means of an extremely short light impulse coming from the objects and producing a sufficiently strong image into a detection state corresponding to the light intensity of the image on the screen of the image sensor at said dot detector and to the intensity of each particular colour component when taking colour pictures. After the short light impulse, the image recorded in the dot detectors of the sensor can in conventional form and by using normal transmission speed be transmitted on a video tape recorder and recorded further on a video tape. Firstly, an advantage of the invention is that by using a light impulse of an extremely short duration, e.g. 5 microseconds, a web running 1000 m/min moves along only approximately 0,1 mm, which is less than for instance the resolution between two adjacent dots in any video system. Moreover, when using this method, pictures can be taken even by means of a conventional video apparatus for domestic use, which is easy to take along and cheap to acquire.

Figure 2:
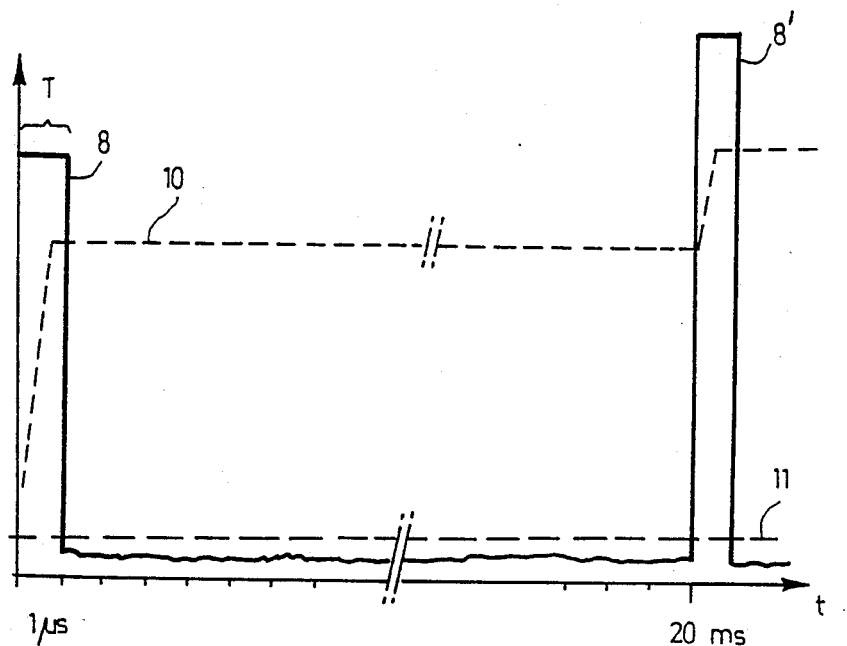

The invention is described in more detail by means of the figures enclosed, in which FIG. 1 shows schematically an apparatus for the application of the method according to the invention and FIG. 2 shows schematically the operation of a dot detector of an image sensor of semiconductor type when producing successive pictures.

Figure 3:
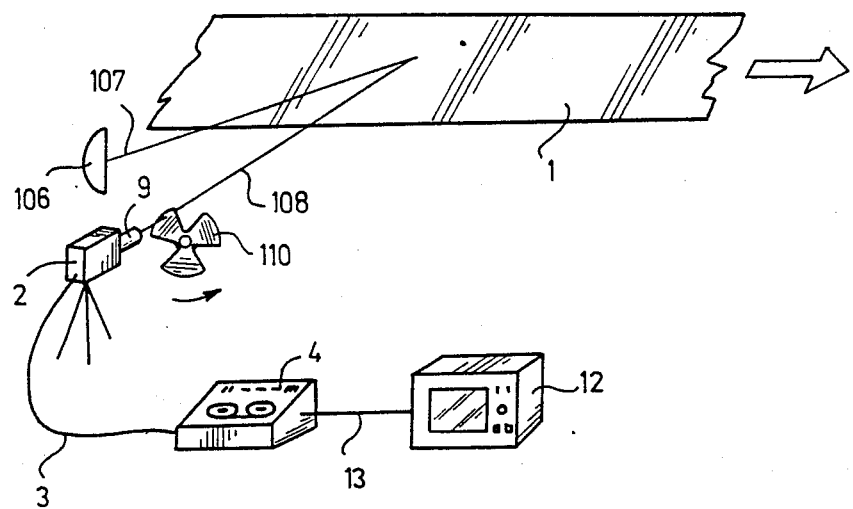

FIG. 3 shows schematically an application of the invention with a mechanical shutter.

In FIG. 1, the object of shooting is a quick-moving paper web 1, of which are taken pictures by means of a video camera 2. To the video camera 2 is by means of a cable 3 connected a video tape recorder 4, on the video tape of which the image produced by means of the camera 2 is recorded. To the video camera 2 is by means of a cable 5 further connected a stroboscope 6, the flashing of which is synchronized by means of the camera.

The video technique and the details attached thereto are generally known per se and therefore, they are not described here more closely. A substantial factor of the invention is that producing an image and recording it are based on a synchronization of the operations of the apparatuses with each other, which takes place by means of a separate synchronizing impulse. When taking pictures of quick-moving objects, a synchronizing impulse is also used to trigger the stroboscope 6 at a desired moment in order to produce a suitable image.

According to the method, the shooting takes place so that a synchronizing impulse triggers through the cable 5 the stroboscope 6, from which a short light impulse 7 of a length of preferably 1–10 microseconds flashes on the object of shooting, i.e. on the paper web. The paper web 1 reflects a light impulse 8 of the same length, which is directed by means of a lens 9 of the video camera 2 on the screen of an image sensor of semiconductor type situated inside the camera and which produces according to the generally known principle of photographing an image corresponding to the object of shooting on the screen of the sensor.

The image sensor of semiconductor type, preferably a so-called CCD-sensor, which is generally known per se, consists of dot detectors placed side by side and on each other like a matrix, whereby in each detector is formed due to the intensity of the light directed on the right place a detection state corresponding to the light intensity or when using a colour sensor, a detection state proportional to the intensity of each partial colour known per se, which state is then read and recorded electrically on a video tape by means of a video tape recorder. The detection state can e.g. be an electric charge or conductivity of the dot in question or some other way known per se to express the intensity of the light obtained by some detector.

During the light impulse 8, the detector adopts a state corresponding to the intensivity of the light impulse, after which each dot detector remains in this detection state after the end of the light impulse and then, the image of the object reflected on the screen of the image sensor during the light impulse remains in the storage of the image sensor so that it can be read and recorded by means of a tape recorder even during a long time.

FIG. 2 shows schematically the operation of an individual dot detector when the intensity of the light impulses directed thereon is varying. During the light impulse 8, the length and so also the exposing time T of which is 1 microsecond, the dot detector adopts a state on a certain level according to a dotted broken line 10, where it remains after the end of the impulse 8 when the light intensity sinks below an electric noise level 11 of the dot detectors of the image sensor. When using a normal video apparatus for domestic use, 20 milliseconds are used for reading and recording the image produced on the image sensor, which time is 20000 times the exposing time of the light impulse 8. After the reading and recording time a new light impulse 8' comes, the length of which is identical with that of the preceding light impulse, but the intensity of which is different from that, being e.g. stronger in the way shown in FIG. 2. During the light impulse 8', the dot detector in question changes its detection state to be greater so as to correspond to the intensity of the light impulse 8' and again, when the light impulse 8' sinks below the electric noise level of the sensor it remains in the detection state adopted, until again, after the image produced has been read and recorded, a new light impulse changes the detection state of the dot detector in question.

The image recorded can be watched in a generally known manner either by coupling the video tape recorder 4 to a television set or by means of a cable 13 to a separate monitor 12 according to FIG. 1. The invention is most preferably adaptable to a conventional video apparatus for domestic use, which is cheap, simple to use and easy to transport. Sharp images are then obtained each twentieth millisecond, which is a sufficient frame frequency in most cases. However, the method is fully adaptable also to video filming at high frame frequencies, whereby more complicated and expensive apparatuses are needed.

A normal video apparatus for domestic use is based on generally used television technique, in which the frame of the display unit is divided into every second line to be shown simultaneously in order to make the difference in motion between the images smaller. However, if very sharp pictures are desired, a solution can be used by means of the method of the invention, whereby the whole image field is shown simultaneously without dividing the lines into different images. The line technique relating to producing pictures in video monitors and television sets is generally known per se and will therefore not be described more closely.

Consequently, in the most preferable embodiment of the invention a stroboscope 6 is used, which is connected to a conventional video apparatus for domestic use and which transmits guided by a synchronizing impulse an exposing impulse of preferably 1–10 microseconds to the object, and a picture of the object is recorded on the image sensor by means of a reflection of the light impulse of the stroboscope. In another embodiment of the method of the invention, the object is continuously exposed to strong light and the light reflecting from the object is cut by means of a mechanical shutter into a light impulse of preferably 1–10 microseconds, which light impulse produces an image on the image sensor of semiconductor type in the camera in the manner described above. In this case, a camera manufactured especially for this purpose is needed, in which camera is installed a mechanical shutter, available in several commonly known solutions. However, a camera like this is considerably more expensive than a simple camera and is thus suitable for special purposes only, when a construction like this for some reason is useful.

FIG. 3 shows the mechanical shutter embodiment wherein elements common to both FIGS. 1 and FIG. 3 are depicted by the same reference numerals. A constant light source 106 provides a continuous beam of light on the object 1 to be viewed. The light reflected from the object is cut by means of a mechanical shutter 110 rotating around its axis. Due to the rotating movement of the shutter 110, light from the reflected beam of light 108 is conducted only during a predetermined exposing time through a camera lens 9 into a camera 2.

The drawings and the description attached thereto are meant to visualize the idea of the invention and they do not prevent the method of the invention from varying with respect to its details within the scope of the claims.

What is claimed:

1. A method of taking pictures of a quick moving object by means of a video camera having a lens and an image sensor, said image sensor including semiconductor dot detectors in a matrix arrangement and a light sensitive image display screen with corresponding dot images, said method comprising the steps of conducting light impulse of a constant high intensity from the object to said lens during a predetermined short exposing time, activating said image sensor is response to said light impulse to produce an image on the screen which corresponds to said object, said image remaining on the screen after the end of the light impulse, reading said image remaining on the screen subsequent to activation of said image sensor, converting said image into electrical signals, recording said electrical signals in the form of a variable magnetic field on a video tape, whereby the exposing time is shorter than the time used for reading and recording the image.

2. A method according to claim 1, wherein the exposing time is 1–10 $\mu$s.

3. A method according to claim 1, wherein the light impulse is formed by exposing the object of shooting during a predetermined exposing time by means of a stroboscope synchronized with a video camera.

4. A method according to claim 1, wherein light coming from the object of shooting is conducted to the image sensor guided by a mechanical shutter during a predetermined exposing time.

5. A method according to claim 1, wherein the shooting is carried out at a frame frequency of 50 Hz at the most.

6. A method according to claim 5, wherein the shooting is carried out at a frame frequency of 50 Hz and the whole image field is recorded in one still frame.

* * * * *